United States Patent [19]

Hayashi et al.

[11] Patent Number: 4,844,296

[45] Date of Patent: Jul. 4, 1989

[54] APPARATUS AND METHOD FOR QUANTITATIVELY DELIVERING FOOD MATERIALS

[75] Inventors: Torahiko Hayashi; Sadao Shibata, both of Utsunomiya, Japan

[73] Assignee: Rheon Automatic Machinery Co., Ltd., Utsunomiya, Japan

[21] Appl. No.: 165,717

[22] Filed: Mar. 8, 1988

[30] Foreign Application Priority Data

Mar. 10, 1987 [JP] Japan .............................. 62-35027[U]
Mar. 10, 1987 [JP] Japan .............................. 62-35028[U]
Mar. 10, 1987 [JP] Japan .................................. 62-54781
Mar. 10, 1987 [JP] Japan .................................. 62-54782

[51] Int. Cl.$^4$ ............................................. B67D 5/08
[52] U.S. Cl. ........................................ 222/1; 222/55; 222/63; 222/413
[58] Field of Search .......................... 222/52, 55–56, 222/63, 271–272, 311, 316, 410, 412–413, 1; 426/503, 516

[56] References Cited

U.S. PATENT DOCUMENTS

| | | | |
|---|---|---|---|
| 3,468,456 | 9/1969 | Cline | 222/55 |
| 3,513,477 | 5/1970 | Hayashi | 222/412 |
| 4,667,852 | 5/1987 | Siemann | 222/55 X |

Primary Examiner—Michael S. Huppert
Attorney, Agent, or Firm—Finnegan, Henderson, Farabow, Garrett & Dunner

[57] ABSTRACT

An apparatus and method for measuring a uniform volume and weight of food material, and continuously delivering it, is provided. The apparatus comprises screws disposed at the bottom of a hopper and a delivering means having a rotating cylinder and vanes freely slidable in respective pairs of slots formed in the periphery of the cylinder. The delivering means is disposed in a housing, and both ends of the vanes slidably contact the inner surface of the side wall of the housing to form compartments between each adjacent pair of vanes. In the apparatus, the material is fed by screws and introduced into the compartment for measuring. Since the rotational speeds of the screw and cylinder are respectively controlled to introduce a sufficient amount of the material into the compartment, the density of the material in the compartment becomes uniform. The material is then continuously discharged from the apparatus.

12 Claims, 6 Drawing Sheets

APPARATUS AND METHOD FOR QUANTITATIVELY DELIVERING FOOD MATERIALS

BACKGROUND OF THE INVENTION

1. Field of the Invention

This invention relates to an apparatus and method for quantitatively delivering food materials such as candy, whipped or custard cream, and mince, and other plastic materials, and, particularly, to an apparatus and method for delivering such materials at a uniform rate without harming their quality.

2. Prior Art

U.S. Pat. No. 3,513,477 discloses an apparatus for measuring and feeding material comprising a pair of screws disposed at the bottom of a hopper and a pair of delivering devices placed on each side of a discharge pipe. The delivering device includes a cylinder, two pairs of slots diagonally formed on the periphery of the cylinder, and a pair of vanes that are perpendicular to each other and inserted in each pair of slots so that they can slide freely through the pair of slots. A swing cam is placed between the two delivering devices so that the cam comes into dynamic contact with the vanes and causes each vane to recede to the periphery of the cylinder. The delivering devices are housed in a housing having front and rear end walls and side walls as shown in FIG. 4. In operation, as the screws rotate, they axially displace the material in the hopper. The material then progressed into the housing through an opening formed in the rear end wall and is exhausted from the discharge pipe, pushed by the vanes as the cylinders rotate while the material is measured by being introduced into a measuring compartment of a uniform capacity formed between two adjacent vanes.

As shown in FIG. 4, a cylinder is coaxially connected to the screw and thus the rotational speeds of the screw and the cylinder cannot be controlled separately.

However, if the density of the material is not uniform and/or air is entrained with the material, it is difficult to measure the weight of the material introduced into the measuring compartment. Therefore, if the density of the material is non-uniform, the apparatus of the prior art cannot deliver a material at a uniform rate. Since typical food materials or plastic materials tend to have different densities, and include air when they are supplied to a hopper, the appartus of the prior art had problems for measuring such materials.

SUMMARY OF THIS INVENTION

An object of this invention is to provide an apparatus and method that can deliver food material, etc. that has a uniform volume and weight, by making uniform the density of the material introduced into the measuring container in the delivering device.

Another object of this invention is to provide an apparatus and method for quantitatively delivering food material, etc. where the proper pressure is applied to the material in the measuring compartment to make uniform the density of the material.

Still another object of this invention is to provide an apparatus and method for quantitatively delivering food materials with low densities, such as piles of cabbage leaves, which expand due to their structures or inclusion of air, into a compartment, by compressing it, to make the densities of the materials uniform by controlling the amounts of the materials to be fed to the delivering device relative to that of the material to be discharged from the delivering device.

A still further object of this invention is to provide an apparatus and method for quantitatively delivering food material that does not harm the quality of the material by adjusting the pressure in the mesuring compartment depending on the type of food material.

According to one aspect of this invention, an apparatus for quantitatively delivering food material is provided, comprising (a) a hopper for said materials, (b) at least one screw means disposed on the bottom of said hopper for axially conveying said material, the rear end thereof being connected to a first drive means, (c) delivering means for quantitatively delivering said material disposed in the proximity of the forward end portion of said screw means including a cylinder having a plurality of pairs of slots diagonally formed on the periphery thereof, and a plurality of vanes, each longer than the diameter of said cylinder and inserted in each pair of slots so that they are slidably movable in said pair of slots, (d) a housing for enclosing said delivering means having a side wall, two end walls, an entrance port formed in one of said walls through which said food material is introduced from said hopper to said delivering means and an exit port positioned away from said entrance port, (e) a shaft passing through one end wall of said housing and extending along the axis of said cylinder, one end thereof connected to said cylinder and the other end thereof operatively connected to a second drive means, and (f) a control means to control said first and second drive means to adjust the ratio of the rotational speeds between said screw means and said shaft, said cylinder being positioned in said housing so that it comes in sliding contact with the inner surface of said side wall of said housing at the area downstream of said exit port in the direction of rotation of said cylinder and is spaced apart from said inner surface at the other areas, said inner surface of said side wall being configured so that the two ends of each vane are made to slide along it, protruding from said cylinder, at the area ranging from said entrance port of said housing to said exit port in the direction of rotation of said cylinder, to form a compartment between an adjacent pair of said vanes, together with said two end walls of said housing, the outer surface of said cylinder and said inner surface of said side wall, while one end of said vane facing said exit port receding to the periphery of said cylinder at the area downstream of said exit port in the direction of rotation of said cylinder.

By another aspect of this invention a method for quantitatively delivering food material is provided, comprising the steps of (a) feeding a selected amount of said materials by the pressure from a feeding means, through a chamber to a delivering means, (b) detecting the pressure on said material in said chamber, and (c) adjusting the pressure in said chamber, by controlling the pressure from said feeding means, to adjust the amount of said material in said chamber, based on the type of said material, thereby delivering said material in a uniform quantity and density.

In the apparatus of this invention the screw means and the cylinder are separated, and are connected to the first and second drive means, respectively, and the rotational speeds of the screw means and the cylinder are controlled separately.

According to this invention, material that has a non-uniform density and takes a larger volume when left alone than compressed due to air in it or its structure is compressed to make its density uniform. In the apparatus of this invention, the rotational speed of the screw means and that of the shaft of the cylinder are controlled so that the material that has an expanded volume is introduced into the compartment by compressing it. Thus, the air in the material is eliminated and the material is measured without inclusion of air, by the volume of the compartment.

Further, according to this invention, the pressure in the compartment can be adjusted by controlling the rotational speed of the screw means and that of the cylinder shaft. If the material is soft, such as cooked strawberries or beans in strawberries or bean jam, its shape is affected when it is under excessive pressure. Even when the material is not very soft, such as dough, its condition is affected by such pressure because the gluten structure is destroyed by the pressure. In the apparatus of this invention, the pressure in the compartment is controlled differently depending on the type or characteristic of the material, to prevent its shape from being damaged. Therefore, the apparatus of this invention can deliver food material of a uniform volume and weight with a uniformly good quality.

EMBODIMENTS

Preferred embodiments of this invention will now be described by reference to the drawings.

Figure 1:
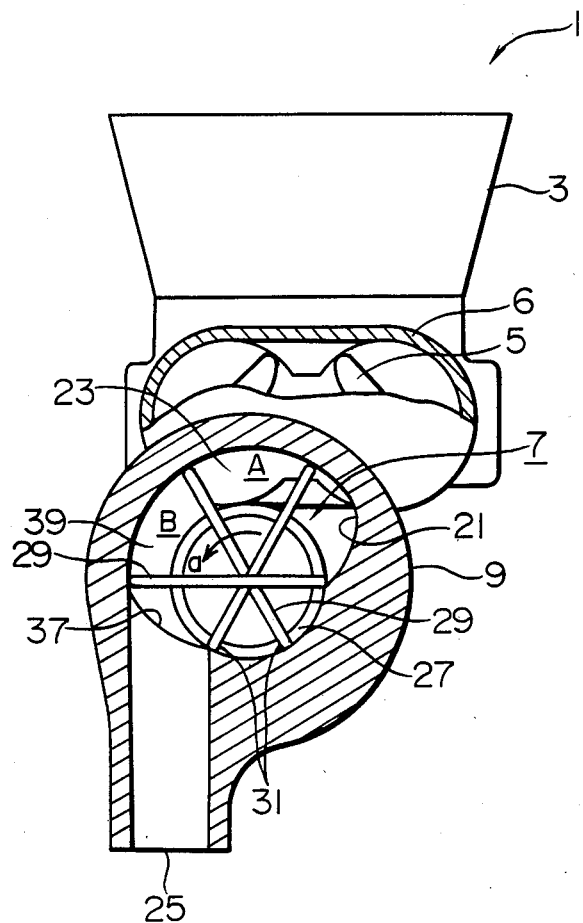
FIG. 1 shows a partially cross-sectional side view of the apparatus of a first embodiment of this invention to show the screws and the delivery device.
Figure 2:
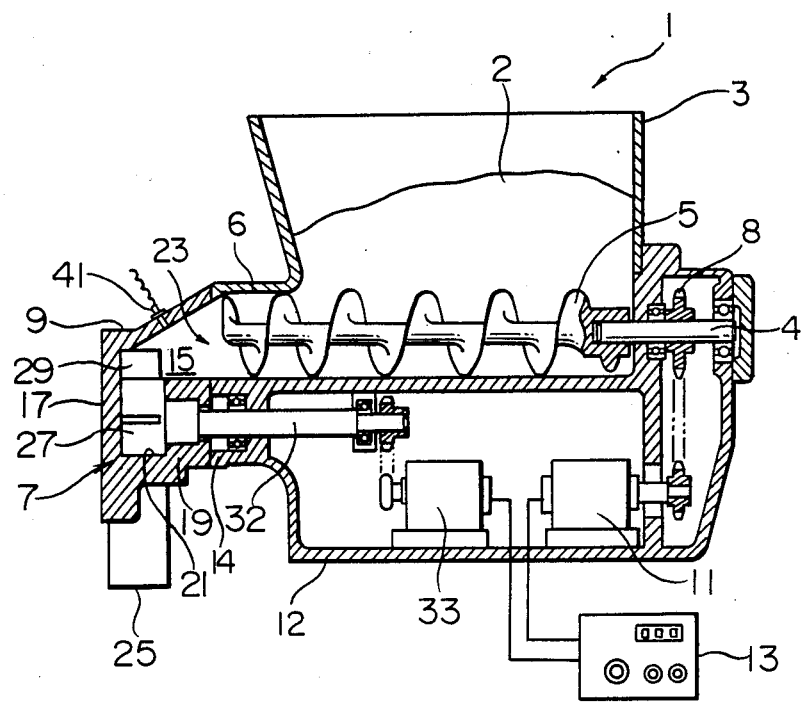
FIG. 2 shows a cross-sectional view of the apparatus of the first embodiment.

FIGS. 1 and 2 show an apparatus of the first embodiment of this invention for quantitatively delivering food materials.

In FIGS. 1 and 2, the apparatus (1) comprises a hopper (3) for food material (2), a pair of parallel screws (5) disposed side by side at the bottom of the hopper (3), a delivering device (7) for quantiatively delivering the food material and a housing (9) for the delivering device (7). The screw (5) is a conventional one disclosed in U.S. Pat. No. 3,513,477. The rear end of each screw (5) is fixedly connected to a shaft (4) which is in turn fixedly connected to a gear (8). The gears engage each other and one of the gears is operatively connected via a chain to a first motor (11) positioned in a casing (12) underneath the bottom of the hopper (3) as shown in FIG. 2. Thus, the motor (11) rotates the pair of screws in opposite directions at the same speed so that the material is conveyed by the screws. The first motor (11) is connected to a control unit (13) via a signal line so that the first motor (11) can control the rotational speed of the screws (5) in response to signals provided from the control unit (13). Thus an operator can adjust the rotational speed of the screws (5) by merely setting the dial of the control unit at a desired value (13).

The housing (9) enclosing the delivering device (7) is connected to the hopper so that the deivering device (7) is positioned in the proximity of the forward end portions of the screws (5) as will be described below. The bottom portion of the hopper (3) is so formed to have a protruding cylindrical portion (6) having an opening oval in cross-section (shown in FIG. 1), into which the forward end portions of the screws extend.

The protruding cylindrical portion (6) provides a path for the material to the housing (9). The material confined therein is effectively conveyed to the opening of the housing (9) by being caused to progress along the helical surfaces of the screws (5) confined by the wall of the protruding cylindrical portion (6).

As shown in FIG. 2, underneath the protruding cylindrical portion (6), the casing (12) has a protruding portion (14) whose front surface is coplanar with the oval opening of the cylindrical portion (6). The housing (9) has front and rear end walls (17, 19) and a side wall between the two end walls (17, 19). An entrance port (23) for food material is formed on the upper part of the rear end wall (19). The rear end wall (19) has openings aligned to and communicating with the opening of the protruding cylindrical portion (6) and the protruding portion (14) of the casing.

As shown in FIG. 2, the opening of the rear end wall (19) communicating with the protruding cylindrical portion (6) forms a chamber (15) and acts as a passage for the material from the screws (5) to the delivering device (7). The entrance port (23) to the delivering device (7) is positioned adjacent to the path for the rotation of the vanes (29). Thus the material axially conveyed by the screws progresses through the chamber (15) via the entrance port (23) to the delivering means (7). The inner surface (21) of the side wall defines an eccentric cylindrical chamber together with the front and rear end walls (17, 19), for the delivering means (7). On the other side of the entrance port in the housing (9), an exit port (25) is provided and through it the food material (2) is discharged from the apparatus (1).

The delivering device (7) has a cylinder (27) and three vanes (29) inserted in three pairs of slots (31) diagonally formed on the periphery of the cylinder (27). The cylinder (27) is connected to a drive shaft (32) extending through the rear end wall (19) into the casing (12), along the axis of the cylinder. The drive shaft (32) is in turn operatively connected to a second motor (33) disposed in the casing (12) so that the cylinder (27) rotates counter-clockwise as indicated by an arrow a in FIG. 1. The second motor (33) is then connected to the control unit (13) via a signal line, and thus controls the rotational speed of the shaft (32) in response to signals from the control unit (13).

The cylinder (27) and the inner surface (21) of the side wall of the housing (9) are constructed so that the periphery of the cylinder (27) contacts the inner surface (21) of the side wall in the downstream area of the exit port (25) in the direction of rotation a of the cylinder (27) and is spaced apart from the inner surface of the side wall at the other area to provide a space between them, as shown in FIG. 1.

Figure 3:
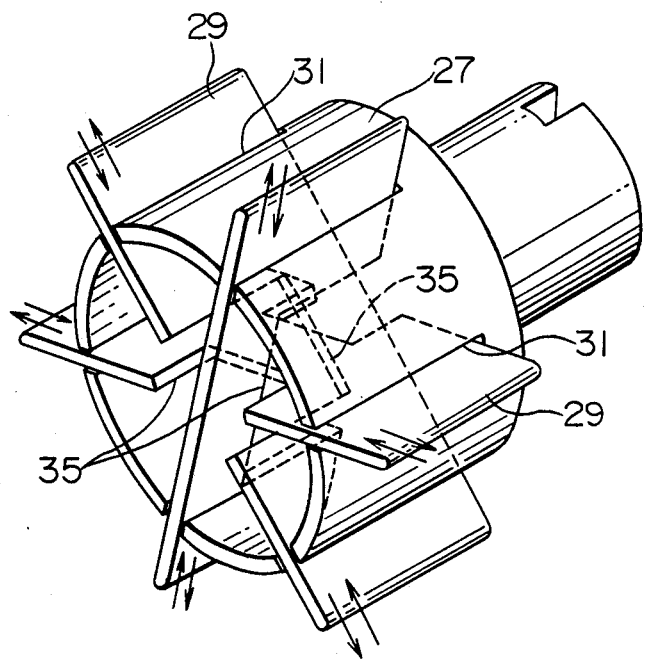
FIG. 3 shows an enlarged perspective view of the cylinder and the vanes of this invention.
Figure 4:
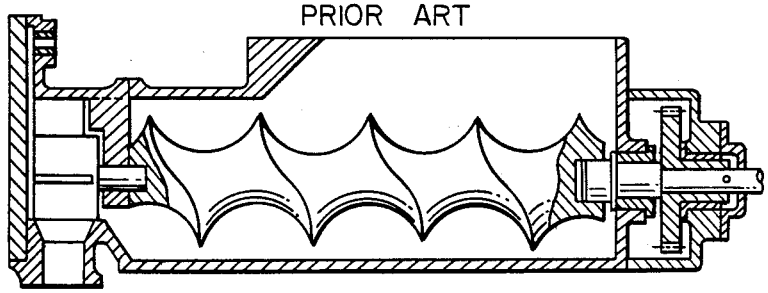
FIG. 4 shows a cross-sectional view of the apparatus for measuring and feeding food material of the prior art.

In FIG. 3, the vanes are angled at 60° with respect to each other. Each vane (29) has a width slightly shorter than the axial length of the cylinder (27) and a length greater than the diameter of the cylinder (27). Two of the vanes (29) are provided with a recess (35) in the middle part thereof in the lengthwise direction. The depth of the recess is about one third of the width of the vane. A third vane has two recesses in its middle part, each having a depth of about one third the width of the vane, thus causing the vane to take an H-shape. Due to this arrangement, the vanes can slide freely within slots (31) without interfering with the other vanes. Each vane (29) is inserted in a pair of slots (31) diagonally formed in the cylinder (27). Thus it moves slidably along a diameter of the cylinder (27). As shown in FIG. 1, the inner surface (21) of the side wall of the housing (9) is configured so that the two ends of each vane are made to slide along it, protruding from the cylinder (27) at the area ranging from an area upstream of the entrance port (23) in the direction of rotation of the cylinder to the exit port (25). Thus, a compartment (39) is formed between each adjacent pair of vanes (29) in this area. The compartment (39) is confined by the front and rear end walls (17, 19), the periphery of the cylinder (27), and the inner surface (21) of the side wall.

In the area where the exit port (25) is provided, tracks (37) are provided. The tracks are steps provided on both end walls (17, 19) and along which the ends of the vanes (29) move. The end of the vane facing the exit port (25), after it passes the port, recedes to the perihery of the cylinder (27), because the line surface (21) of the side wall along which the other end of the vane slides begins to be spaced apart from the periphery of the cylinder (27).

As shown in FIG. 1, four compartments are provided in the area around the cylinder (27) other than a short stretch downstream of the exit port (25). The uppermost compartment (39) indicated is open to the entrance port (23) formed on the rear end wall (19). However, when the compartment (39) moves downstream, leaving the entrance port (23), and arrives at a position indicated by B, it is completely closed from the outside thereof to provide a measuring container. When the compartment (39) arrives at the exit port (25), it communicates with the port to discharge the material in it. The vanes (29) are similar to the ones disclosed in U.S. Pat. No. 3,513,477 (which is incorporated in this application as a reference).

On the wall of the chamber (15) formed between the forward end portions of the screws (5) and the entrance port (23) on the rear end wall (19), a pressure sensor (41) is provided. The pressure sensor detects the pressure on the food material in the chamber and sends a signal indicating the pressure to the control unit (13).

The control unit (13) includes a memory storing a reference pressure value and a comparator comparing the reference value with the pressure measured by the sensor (41). Thus when an operator inputs a proper pressure as a reference value to the control unit (13) by setting the dial at the proper value, the control unit (13) controls the motors (11, 33) to adjust the rotations of the screws (5) and the cylinder (27) so that the proper pressure is imparted to the food material in the chamber (15).

In operation, as the screws rotate, the food material (2) in the hopper (3) progresses along the helical propelling surfaces of the screws (5). Thus the screws (5) axially convey the material (2), in the direction of the delivering device (7). Thus the material (2) progresses through the chamber (15) and then into the compartment (39) at the position A via the entrance port (23). As the cylinder (27) rotates in the direction a, the compartment (39) reaches the position B. Since the rear end wall does not include any part of the entrance port (23) at the position B, the compartment (39) is completely sealed and functions as a measurement container to measure the amount of the food material by the volume of the compartment (39). When the compartment (39) reaches the area where the exit port (25) is provided, the vanes begin to recede to the periphery of the cylinder (27) so that the measured food material can be discharged from the exit port (25).

In this invention, the rotational speeds of the screws (5) and that of the cylinder (27) are controlled to provide pressure on the food material (2) in the chamber (15) so that a sufficient amount of the food material (2) is introduced into the compartment (39) to make the density of the material in it uniform. That is, the rotational speeds of the screws (5) and that of the cylinder (27) are controlled so that the material that is expanded due to space formed therein or due to inclusion of air can be compressed before being fed into the compartment.

Further, in this invention, the pressure on the food material (2) in the chamber (15) can be adjusted based on the type of the material (2), so that it can avoid crushing a soft material. By changing the relationship between the rotational speed of the screws (5) and that of the cylinder (27), the pressure on the food material (2) in the chamber (15) is adjusted because the amount of the material to be fed to the chamber (15) can be adjusted.

In this embodiment, the pressure in the chamber (15) is detected by a sensor (41). This causes the pressure on the food material (2) in the compartment (39) at the position A to be approximately equal to that in the chamber (15). The sensor (41) sends signals indicating the pressure on the food material (2) in the chamber (15) to the control unit (13), which controls the motors (11, 33) in response to the signals to adjust the rotational speed of the screws (5) and that of the cylinder (27). Accordingly, the pressure on the food material (2) in the chamber (15) and thus the compartment (39) is maintained at a proper value.

According to an embodiment, the control unit (13) sends a signal to the first motor (11) to stop the rotations of the screws (5) when the pressure on the food material (2) in the chamber (15) exceeds the proper pressure. When the pressure returns to the proper level, the control unit (13) sends a signal to the first motor (11) to start the rotations of the screws (5).

Alternatively, the control unit (13) may be arranged to continuously adjust the rotational speeds of the screws (5) based on the comparison between the pressure detected and the proper pressure. In this alternative embodiment, the rotational speed of the screws decreases when the pressure detected exceeds the proper pressure. In contrast, the speed of the screws (5) increases when the pressure detected is lower than the proper pressure.

Further, the control unit (13) may be arranged so that the rotational speed of the cylinder (27) can be adjusted.

The sensor (41) is not required if the characteristics of the material are known. In such a case, the rotational speed of the screws (5) can be calculated relative to the rotational speed of the cylinder (27), and the control unit (13) may comprise an input means through which an operator can input the calculated rotational speed of the screws (5) and that of the cylinder (27).

Figure 5:
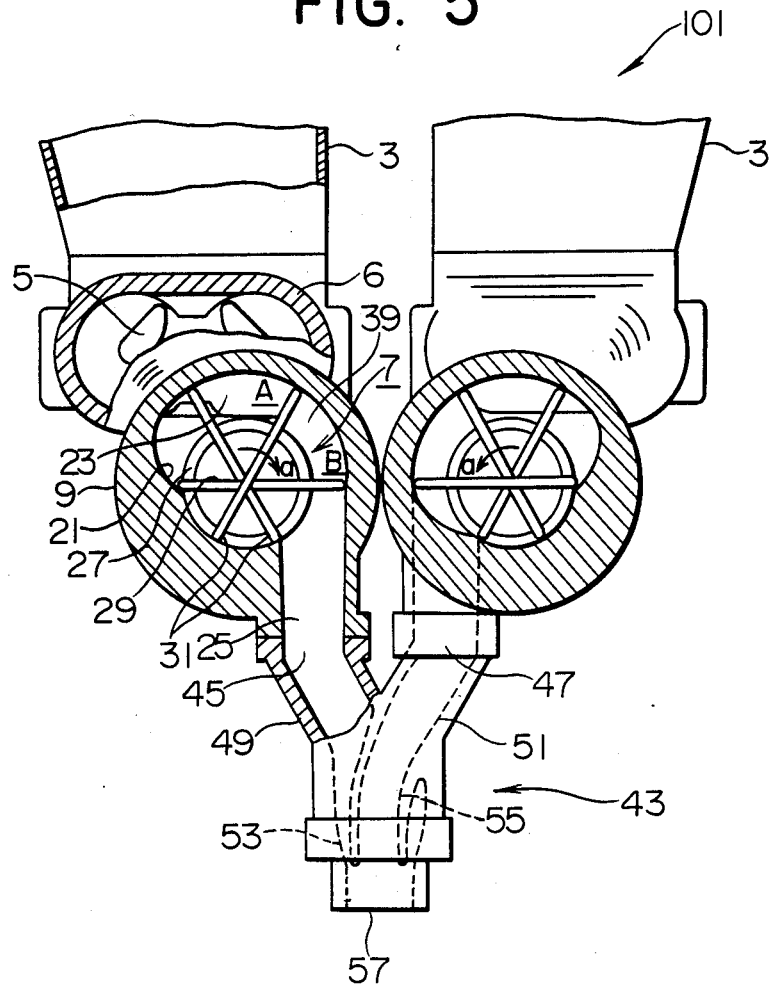
FIG. 5 shows a partially cross-sectional view of an apparatus of a second embodiment of this invention.

FIG. 5 shows the apparatus (101) of a further embodiment of this invention. The apparatus (101) is, in general, a combination of two apparatuses (1) of the first embodiment and a bifurcated composite pipe (43) having two inlet ports (45, 47) connected to the exit ports of the two apparatuses (1).

The apparatus on the right side in FIG. 5 has the exact same construction as that of the apparatus (1) in FIGS. 1 and 2 and the apparatus on the left side has the mirror image of the apparatus (1) and the cylinder of the delivering means rotates clockwise as indicated by an arrow a'.

The bifurcated composite pipe (43) has a first pipe portion (49) connected to the first inlet port (45) and a second pipe portion (51) connected to the second inlet port (47). As shown in FIG. 5, the lower part of the second pipe portion (51) extends into the first pipe portion (49) concentric with the latter, to a point near the exit port (57), thereby forming an outer tube (53) and an inner tube (55). The outer tube (53) communicates with the first pipe portion (49) and the inner tube (55) communicates with the second pipe portion (51). One of the two hoppers (3, 3) contains a crust material such as dough, and the other a filler material such as bean jam. Since the cylindrical body of the filler material delivered through the second inlet port (47) is concentrically inserted into the cylindrical body of the crust material, through the pipe portion (51) and the inner tube (55), a cylindrical body containing a filler material enclosed by a crust material is produced and quantitatively delivered from the exit port (57). Therefore, the apparatus (101) of this embodiment can quantitatively deliver a cylindrical body containing filler and crust materials with a uniform density and quality.

Figure 6:
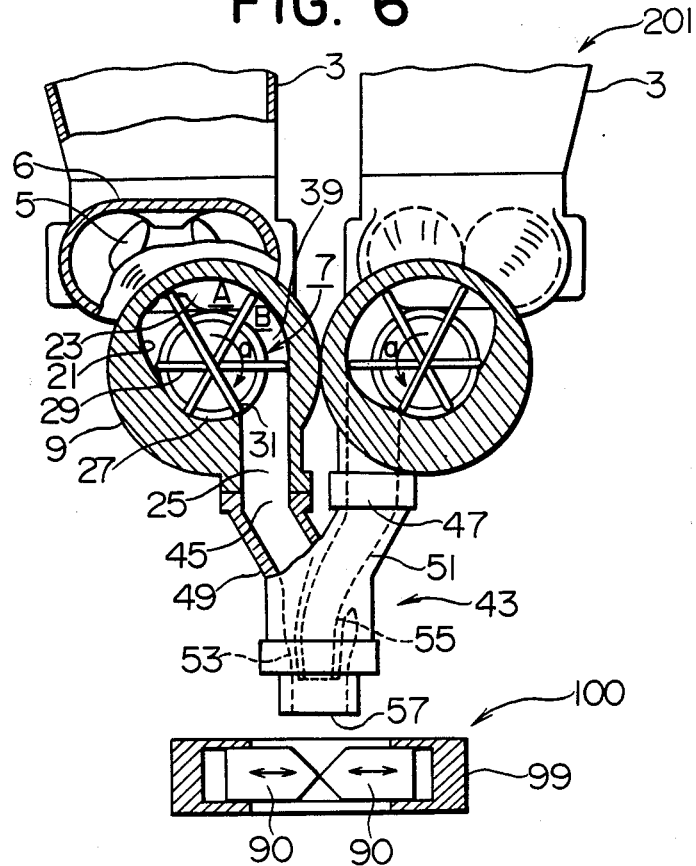
FIG. 6 shows a partially cross-sectional view of an apparatus of a third embodiment of this invention.
Figure 7:
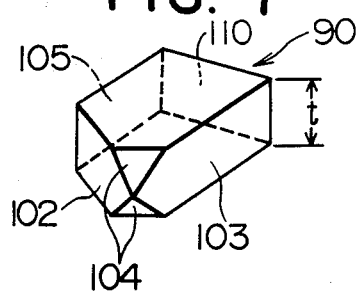
FIG. 7 shows an enlarged perspective view of one of the members constituting the assembly of the shaping device in the apparatus of the third embodiment.
Figure 8:
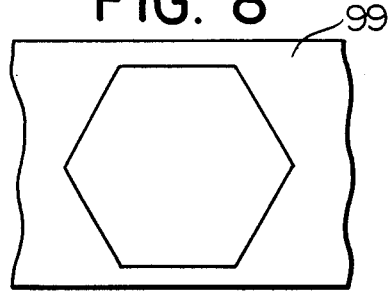
FIG. 8 shows a plan view of the frame in which the assembly is housed.
Figure 9:
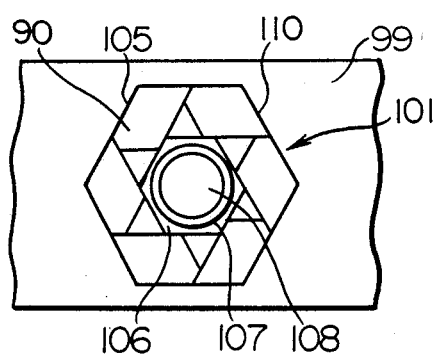
FIGS. 9, 10 and 11 show plan views of the assembly in the apparatus of the third embodiment, in which the positional relationships of the members in FIG. 7 and the cylindrical body of a food material during and at the end of a shaping cycle are illustrated.
Figure 10:
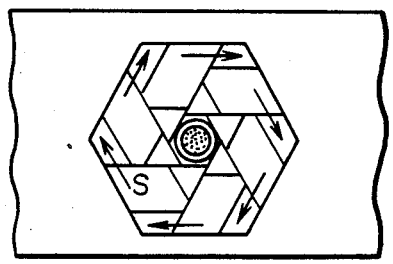
Figure 11:
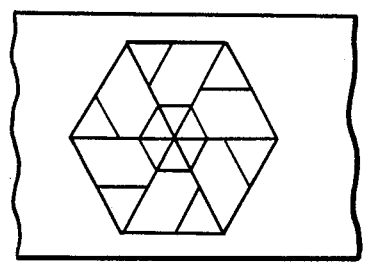
Figure 12:
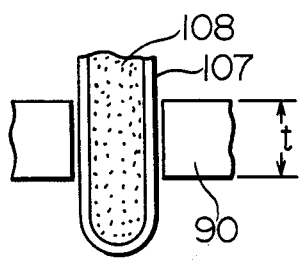
FIGS. 12, 13 and 14 show cross-sectional views of the assembly, corresponding to FIGS. 9, 10 and 11, respectively, illustrating the process of constricting the cylindrical body by the surfaces of the members.
Figure 13:
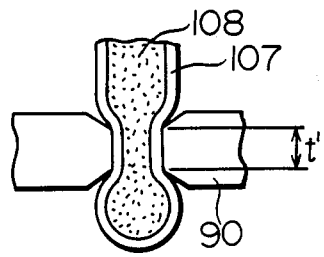
Figure 14:
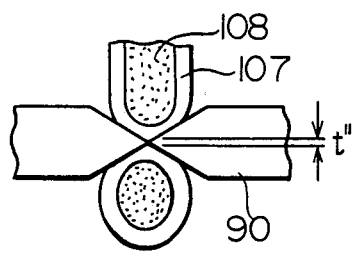

The apparatus of this invention may have a shaping device. FIG. 6 shows the apparatus (201) of another embodiment of this invention in which the apparatus (101) of the aforementioned embodiment further includes an apparatus for shaping a spherical body (100) downstream of the exit port (57). The shaping device may be any conventional shaping means. However, in this preferred embodiment, the device (100) is the one disclosed in U.S. Ser. No. 900,074, filed on Aug. 9, 1986 now U.S. Pat. No. 4,734,024, which is incorporated in this application as a reference. As shown in FIG. 9, the device (100) includes an assembly (101) comprising six circumferentially disposed members (90). Each member (90) is octahedral with two opposing trapezoidal surfaces forming top and bottom surfaces, first and second adjoining sliding surfaces (102, 103) and top and bottom slopes (104), and an outer surfaces (105, 110). The members (90) are housed in a frame (99) as shown in FIG. 8 to form an opening (106) at their center as shown in FIG. 9. The cylindrical body composed of a crust and filler material (107, 108) delivered from the exit port (57) is supplied to the opening (106) as shown in FIGS. 9 and 14. In operation, the members (90) move in the direction as indicated by arrows S to close the opening (106), while the outer surface (110) of each member (90) slides on the inner wall of the frame (99) as shown in FIG. 10. Finally the assembly is completely closed, the opening disappears and the body is cut into a spherical body as shown in FIGS. 11 and 14. Thus, a two-layered spherical body with filler material being completely encrusted with the crust material, and having a uniform density and quality, can be produced.

According to this invention, food material of the same volume and weight can be continuously measured and delivered from a material or materials having uneven densities by pushing the materials into a measuring container with pressure so as to make their densities uniform. Further, by controlling the pressure depending on the type of the material to be within a range of pressure strong enough to compress the material but not so strong as to destroy it, the material is quantitatively delivered without damaging its quality even if the material is readily affected by excessive pressure.

We claim:

1. An apparatus for quantitatively delivering food materials comprising:
   a hopper for said materials, said hopper having a bottom and a rear end,
   a first and second drive means,
   at least one screw means, disposed on the bottom of said hopper for axially conveying said material, having a rear end connected to the first drive means, and having a forward end portion,
   delivering means for quantitatively delivering said material disposed in the proximity of the forward end portion of said screw means including a cylinder having a plurality of pairs of slots diagonally formed on the periphery thereof, and a plurality of vanes, each longer than the diameter of said cylinder and inserted for slideable movement in a corresponding pair of slots, each vane having two ends,
   a housing for enclosing said delivering means having a side wall, an inner surface of said side wall, two end walls, an entrance port formed in one of said walls through which said food material is introduced from said hopper to said delivering means, and an exit port positioned away from said entrance port,
   a shaft passing through one end wall of said housing and extending along the axis of said cylinder, one end thereof connected to said cylinder and the other end thereof operatively connected to the second drive means, and
   a control means to control said first and second drive means to adjust the ratio of the rotational speeds between said screw means and said shaft,
   said cylinder being positioned in said housing so that it comes in sliding contact with the inner surface of said side wall of said housing at an area downstream of said exit port in the direction of rotation of said cylinder and is spaced apart from said inner surface at other areas, said inner surface of said side wall being configured so that the two ends of each vane are made to slide along it, protruding from said cylinder, at an area ranging from said entrance port of said housing to said exit port in the direction of rotation of said cylinder, to form a compartment between an adjacent pair of said vanes, together with said two end walls of said housing, the outer surface of said cylinder and said inner surface of said side wall, while one end of said vane facing said exit port recedes to the periphery of said cylinder at the area downstream of said exit port in the direction of rotation of said cylinder.

2. The apparatus of claim 1, wherein said control means is adapted to control said first and second drive means to adjust the rotational speeds of at least one of said screw means and said shaft.

3. The apparatus of claim 1, further comprising a pressure chamber positioned between the forward end portion of said screw means and said entrance port of said housing, and a pressure sensor provided in said chamber to measure the pressure in said chamber and emit signals to said first and second drive means to adjust the rotational speeds of said screw means and said shaft responsive to said signals.

4. The apparatus of claim 3, wherein said sensor is adapted to emit signals to said first and second drive means to stop and start the rotation of said screw means and said shaft responsive to said signals.

5. The apparatus of claim 3, further comprising a memory means for storing a reference value and a comparator means for comparing said reference value and said signals from the pressure sensor to emit said signals to said first and second drive means.

6. The apparatus of claim 1, further comprising an input means for inputting a control value for controlling said first and second drive means to adjust the rotational speeds of said screw means and said shaft.

7. The apparatus of claim 1, further comprising tracks for said vanes provided on the end walls of said housing where said exit port is provided.

8. The apparatus of claim 1, further comprising a second hopper for a second food material, a second screw means, a second delivering means, a second housing, a second shaft, and a bifurcated composite pipe having a first and second inlet port, a first and second pipe portion connected to said first and second inlet ports, respectively, and a pipe portion downstream of said first and second pipe portions, having concentric outer and inner tubes, the outer tube communicating with one of said pipe portions, and the inner tube communicating with the other of said pipe portions, said exit ports of the two housings being connected to said first and second inlet ports respectively to produce a cylindrical body consisting of filler and crust materials.

9. The apparatus of claim 1 further comprising an apparatus for shaping a spherical body disposed downstream of said exit port.

10. The apparatus of claim 8 further comprising an apparatus for shaping a spherical body disposed downstream of said bifurcated composite pipe.

11. A method for quantitatively delivering food material, by continuously feeding said material into a chamber under pressure applied from a feeding means, and continuously introducing said material from said chamber into a sealed compartment provided on a rotating cylinder in a delivering means, comprising the steps of:
   detecting the pressure in said chamber,
   controlling the rotational speed of said cylinder in accordance with the pressure detected, and
   discharging said material from said sealed compartment, thereby delivering said material in a uniform quantity and density.

12. A method for quantitatively delivering food material having a uniform density, comprising the steps of:
   feeding said material into a chamber under pressure applied from a feeding means;
   introducing said material from said chamber into a sealed compartment provided on a rotating cylinder in a delivering means;
   detecting the pressure in said chamber;
   controlling rotational speed of said cylinder and said feeding means in accordance with the pressure detected for introducing a uniform quantity and density of said material into said sealed compartment; and
   rotating said cylinder for discharging said uniform quantity and density of said material from said sealed compartment.

* * * * *